May 15, 1923.
A. M. HIRSH ET AL
PIPE JOINT
Filed April 18, 1922
1,455,250
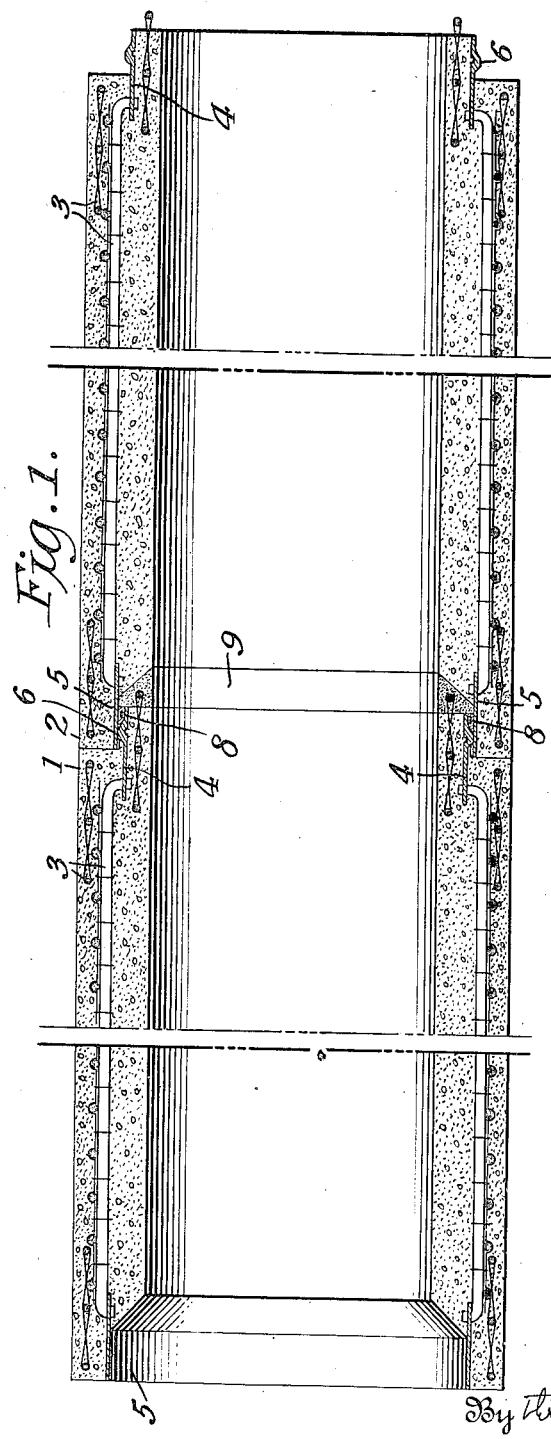
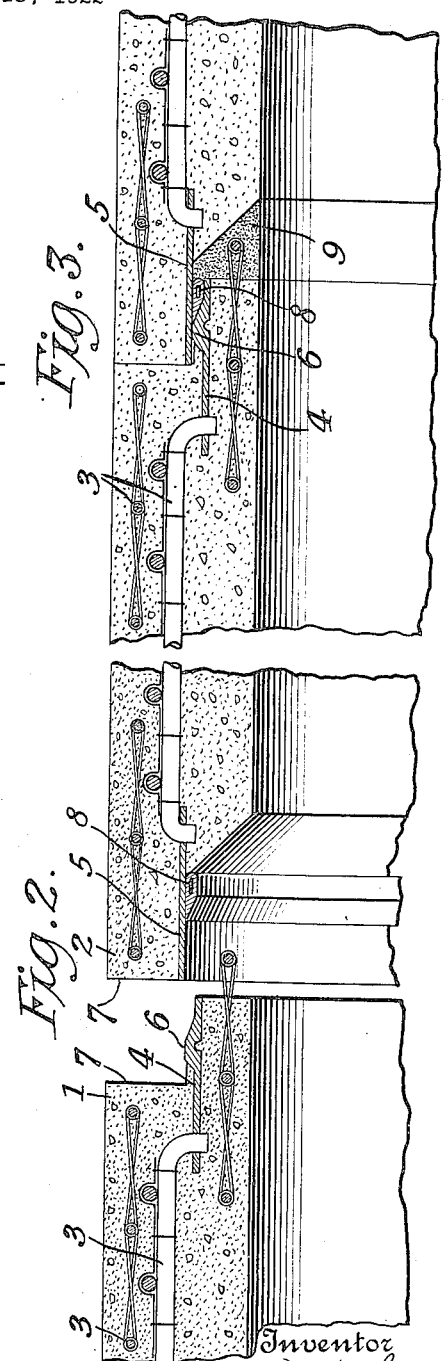
Inventor
Allan M. Hirsh
John C. Mitchell
By their Attorneys
Cooper, Kerr & Dunham Patented May 15, 1923.

1,455,250

UNITED STATES PATENT OFFICE.

ALLAN M. HIRSH, OF MONTCLAIR, AND JOHN C. MITCHELL, OF EAST ORANGE, NEW JERSEY, ASSIGNORS TO LOCK JOINT PIPE COMPANY, OF AMPERE, NEW JERSEY, A CORPORATION OF NEW JERSEY.

PIPE JOINT.

Application filed April 18, 1922. Serial No. 554,787.

*To all whom it may concern:*

Be it known that we, ALLAN M. HIRSH, residing at Montclair, county of Essex, State of New Jersey, and JOHN C. MITCHELL, residing at East Orange, county of Essex, and State of New Jersey, both citizens of the United States, have invented certain new and useful Improvements in Pipe Joints, of which the following is a full, clear, and exact description.

In an application filed by John C. Mitchell, one of the joint inventors of the improvement which forms the subject of the present application, and which was filed on April 18, 1922, Serial No. 554,505, is shown and described a novel form of joint for concrete pressure pipes in which iron or steel cylinders are molded integrally with the ends of abutting pipe sections. These cylinders are of diameters which permit those of two abutting pipe sections to telescope when the sections are brought together and have lead coatings or coverings over their contacting surfaces at their ends. On one of these coatings is an annular ridge or raised portion of such diameter as to be sheared in passing over the surface of the other coating when the sections are brought together, for the purpose of securing a more perfect joint between the two, and provision is made for tamping in an elastic lead gasket or packing between the two coated cylinders and beyond the sheared projection after the sections have been assembled.

By this means a durable, tight and highly efficient joint for concrete pressure pipes is secured, but in practice it has been found that for large pipes, particularly in long lengths, the cost of the lead required for such joints is a very serious item, and to avoid this and nevertheless to secure all of the practical advantages of this form of joint, we have devised the joint for which we now seek protection by Letters Patent, and which may be thus generally defined.

Instead of using lead coated cylinders and molding them into the pipe sections, we use plain metal cylinders, of iron, steel, or any other hard and cheap metal of requisite strength. One of such cylinders, that of larger diameter, has a smooth or plain surface, but the other has a ridge or raised portion of such diameter that it will pass or slide over the surface of the other when the pipes are assembled, not necessarily with a shearing action, but with as smooth a fit as ordinary precautions in manufacture can secure.

This ridge or raised portion is at a sufficient distance from the end of its cylinder to permit a lead packing or gasket of proper dimensions to lie between the two cylinders, which packing is tamped firmly home by tools introduced through an open space in the bell end of the sections and within the pipe, in order to complete a perfectly tight joint between the two sections. The open space, after the packing is tamped, is filled up with concrete to complete the pipe.

In the drawings we have shown the best form of this pipe joint that we have yet found, and from the detailed description which follows, it will be shown how our improvement may be practically accomplished.

Fig. 1 is a longitudinal section of a length of completed pipe.

Fig. 2 is a similar section, on an enlarged scale, of a portion of the spigot end of a pipe section, and Fig. 3 is an enlarged view of portion of two united pipe sections.

The improvement is applicable more especially to reinforced concrete pipes. These are made in sections which are to be assembled and each of these has a spigot end 1, and a bell end 2. The reinforcements 3 may be of any known character.

In the process of molding, a cylinder of iron, steel or the like 4 is molded into a section at the spigot end, and is suitably interlocked with the longitudinal reinforcing rods. Similarly a cylinder 5 is molded into the bell end and linked up with the same longitudinal reinforcing rods.

The cylinders 4 are cast or otherwise formed into annular ridges or raised portions 6 near their forward or entering ends and are generally covered up to such ridges or high points by the concrete, about up to or near the level of such high points, and the external diameter of such ridges or high points 6 and the internal diameter of the cylinders 5 are such that the two sections may be assembled until the shoulders 7 of the abutting sections closely abut, the ridges, in this operation, passing over and in close proximity to the inner faces of the bell end cylinders.

Before two sections are assembled lead packings or gaskets 8 are inserted in the bell, and these are of such shape that they fit more or less into the annular space between the forward or entering end of the cylinder 4 and the inner wall of the cylinder 5, and such gaskets are preferably in the nature of lead tubes with a filling of compressible fibrous material such as are commonly used in like cases. They are tamped home firmly after the sections are assembled, by men working on the inside of the pipes, and when so tamped tightly close the joints between abutting sections and occupy the position shown in the complete joint at the right in Fig. 3.

The space between the end of the spigot and the interior shoulder of the bell is then filled with cement 9, as shown, which completes the joint.

This joint is particularly applicable to, and useful for, pipes of large diameter. It has been found to secure all of the advantages of the joints on which it is an improvement and is especially desirable on the score of cost. Such joints may be provided for and made at very much less expense than those involving the use of lead coated cylinders, while they are equally serviceable.

In the copending application hereinabove referred to, it is shown in detail how the cylinders molded into the ends of the pipe sections may be continuous throughout such sections, instead of being connected by reinforcing ends. This is equally true in the present case.

What we claim is—

1. A joint for concrete pressure pipes comprising, in combination, hard metal cylinders integrally molded into the ends of abutting sections, one of said cylinders having at a given distance from its end a ridge or raised portion of a diameter to fit into the other cylinder when two sections are telescoped and assembled, and a packing or gasket adapted to be tamped in between the two cylinders in the space between the said ridge and the end of the cylinder on which it is formed to complete the joint between the opposing surfaces of the telescoped pipe sections.

2. In a joint for concrete pressure pipes, the combination with pipe sections having bell and spigot ends, of hard metal cylinders integrally molded into the ends of abutting sections, the spigot cylinder having a ridge or raised portion of a diameter to fit into the bell cylinder when two sections are telescoped and assembled, and a gasket adapted to be tamped between the entering end of the spigot cylinder and the inner surface of the bell cylinder in advance of the said ridge, to thereby form a tight joint between the opposing surfaces of the telescoped pipe sections.

3. A joint for concrete pressure pipes comprising, in combination, short hard metal cylinders embedded in the ends of each pipe section and of different diameters so as to telescope, longitudinal reinforcing rods connecting together the cylinders of each pipe section, the cylinders of smaller diameter having at a given distance from their ends annular ridges or raised portions of such diameter as to closely fit into the adjacent cylinder when two pipe sections are telescoped and assembled, and a lead packing between the two cylinders in the space between such raised portion and the end of the cylinder on which it is formed.

In testimony whereof we hereto affix our signatures.

ALLAN M. HIRSH.
JOHN C. MITCHELL.